(12) United States Patent
McPherson

(10) Patent No.: US 9,908,576 B2
(45) Date of Patent: Mar. 6, 2018

(54) MODULAR BICYCLE STORAGE STRUCTURE

(71) Applicant: Robert S. McPherson, Washington, DC (US)

(72) Inventor: Robert S. McPherson, Washington, DC (US)

(73) Assignee: BAAS, INC., Washington, DC (US)

( * ) Notice: Subject to any disclaimer, the term of this patent is extended or adjusted under 35 U.S.C. 154(b) by 0 days.

(21) Appl. No.: 15/148,275

(22) Filed: May 6, 2016

(65) Prior Publication Data

US 2016/0325798 A1      Nov. 10, 2016

Related U.S. Application Data

(60) Provisional application No. 62/157,775, filed on May 6, 2015.

(51) Int. Cl.

| | |
|---|---|
| *B62H 3/08* | (2006.01) |
| *B62H 3/00* | (2006.01) |
| *B62H 5/20* | (2006.01) |
| *E04H 6/00* | (2006.01) |
| *B65D 85/68* | (2006.01) |
| *B65D 88/02* | (2006.01) |
| *B65D 88/54* | (2006.01) |
| *B65D 90/02* | (2006.01) |
| *B65G 13/00* | (2006.01) |

(52) U.S. Cl.
CPC .............. *B62H 3/08* (2013.01); *B62H 3/00* (2013.01); *B62H 5/20* (2013.01); *B65D 85/68* (2013.01); *B65D 88/022* (2013.01); *B65D 88/546* (2013.01); *B65D 90/02* (2013.01); *B65G 13/00* (2013.01); *E04H 6/005* (2013.01); *B65D 2585/6862* (2013.01)

(58) Field of Classification Search
CPC .............. E04H 6/005; B62H 3/08; B62H 3/00
See application file for complete search history.

(56) References Cited

U.S. PATENT DOCUMENTS

| 3,837,511 A | * | 9/1974 | Howlett | ................. F25D 25/04 |
| | | | | 414/286 |
| 3,949,528 A | * | 4/1976 | Hartger | ................. E04H 6/005 |
| | | | | 217/37 |

(Continued)

FOREIGN PATENT DOCUMENTS

| DE | 4126797 A1 | * | 3/1992 | ............... B62H 3/00 |
| DE | 202013004304 U1 | * | 10/2013 | ............ E04H 6/005 |

(Continued)

*Primary Examiner* — Kaitlin S Joerger
(74) *Attorney, Agent, or Firm* — Meagher Emanuel Laks Goldberg & Liao, LLP

(57) ABSTRACT

Disclosed herein is a modular bicycle storage structure designed to maximize the number of bicycles that can fit into it. The structure is designed to provide a private locker to each bicycle, which is accessible by a locker door, and secured using a standard bicycle U-Lock. The structure may use bicycles that have foldable, twistable or removable handlebars in order to reduce their overall width. The user generally aligns the pedals in a specific way before inserting the bicycle into the structure. The pedals slide into a groove formed in the side wall. This allows for overlapping of pedals for adjacent bicycles providing a compact storage configuration.

25 Claims, 10 Drawing Sheets

(56) References Cited

U.S. PATENT DOCUMENTS

| | | | | |
|---|---|---|---|---|
| 4,506,786 A | * | 3/1985 | Buchanan | B65D 85/68 206/335 |
| 6,349,515 B1 | * | 2/2002 | Naudts | E04H 6/005 52/174 |
| 2007/0107322 A1 | | 5/2007 | Blume | |
| 2014/0182094 A1 | | 7/2014 | Zuraski et al. | |
| 2015/0321569 A1 | * | 11/2015 | Muait Jardim | E04H 6/005 320/101 |
| 2016/0168843 A1 | * | 6/2016 | Bell | B60P 3/122 280/79.2 |

FOREIGN PATENT DOCUMENTS

| | | | |
|---|---|---|---|
| EP | 0666390 A1 | 8/1995 | |
| EP | 2905398 B1 * | 3/2017 | B62H 3/00 |
| FR | 2764261 A1 | 12/1998 | |
| FR | 2799720 A1 | 4/2001 | |
| GB | 2481978 A | 1/2012 | |
| KR | 100950901 B1 | 3/2010 | |

* cited by examiner

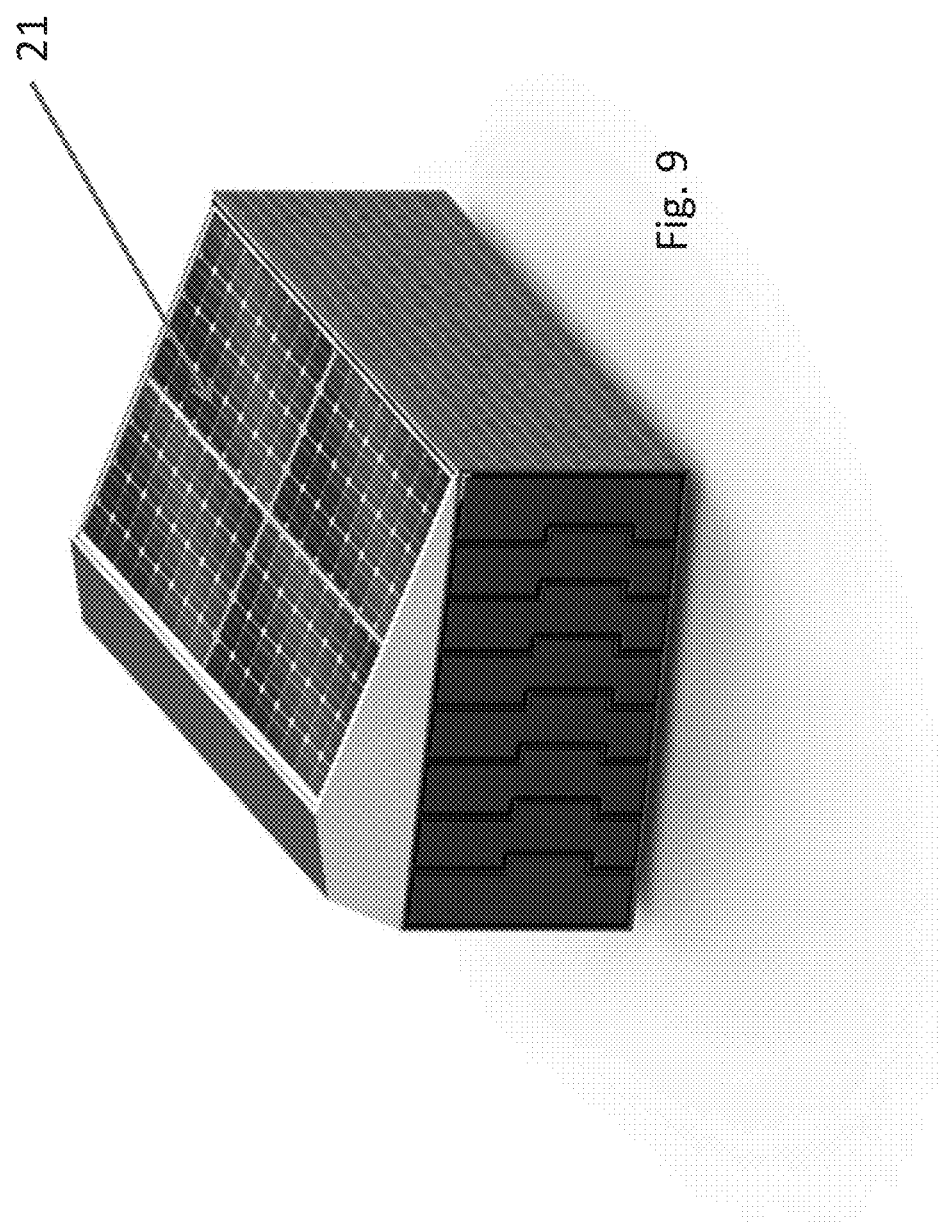

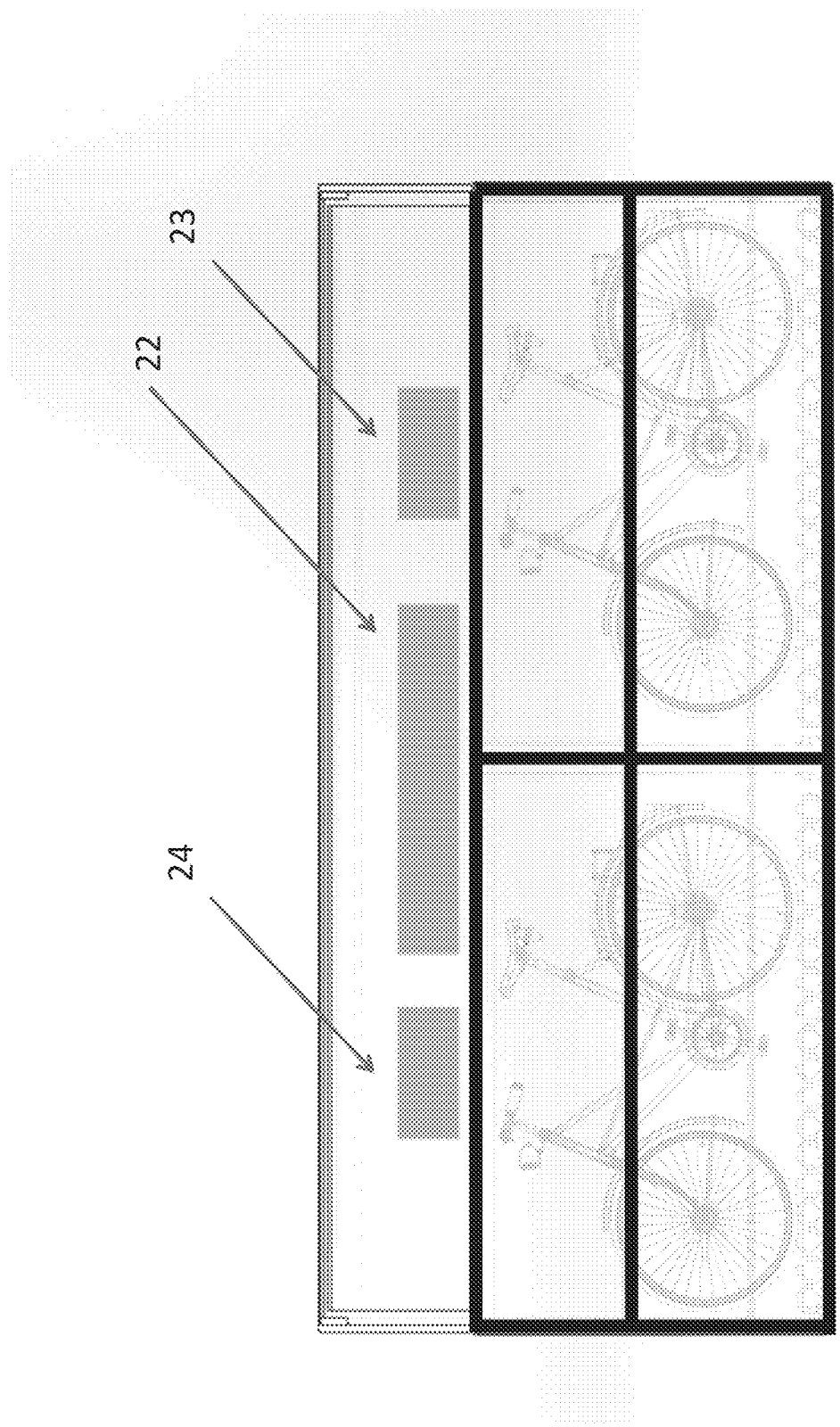

US 9,908,576 B2

MODULAR BICYCLE STORAGE STRUCTURE

CROSS-REFERENCE TO PRIOR FILED APPLICATIONS

This application claims priority to U.S. provisional application 62/157,775 filed on May 6, 2015 which is incorporated herein in its entirety.

TECHNICAL FIELD

This invention relates to storage structures for bicycles and in more particular compact and portable storage structures for multiple bicycles with integrated locking capabilities.

BACKGROUND

As bicycles become more technologically advanced, and cities have increasingly provided better infrastructure for cyclists, bicycling as a means for daily transportation has grown significantly in recent years. Bike sharing programs in particular have grown in popularity because they offer a convenient way for people to access a bike without the expense or maintenance required of ownership. Additionally, bike shares alleviate a major problem of owning a bike, which is finding a place to secure or store it while it is not being used. In a bike share, the bike is returned to a designated place, normally a docking station or locker provided by the system, and typically in a public space.

There are numerous problems with the existing docking stations and bicycle lockers currently available. For docking stations, they tend to take up a lot of space in an urban landscape. This makes it difficult for the bike share operator to find enough locations in heavily populated areas of the city in order for the system to be successful. Additionally, docking stations don't offer any enclosure of the bikes, which leaves the bikes vulnerable to damage, theft, and deterioration from the elements. To mitigate these issues, the standard bike used in bike shares is typically very rugged and heavy, which makes them expensive to produce. Furthermore, while they are made to be very durable, the added weight becomes a burden on the riders, especially in riding a bike up a hill.

Because bicycles have many protruding and detachable parts that can make them susceptible to damage, theft, and weather, it is believed the best way to store bikes is in a protected, enclosed structure. There are existing bicycle storage lockers that achieve some level of protection, but improvements are needed. For example, more compact storage structures are desirable because they can reduce the amount of space the lockers take up per bicycle.

BRIEF DESCRIPTION OF DRAWINGS

FIG. 9 is a view of the storage structure configured with a solar panel on the roof; and FIG. 10 shows the accompanying electrical apparatus inside the structure for use in connection with a solar panel.

DETAILED DESCRIPTION

Discloses herein is a storage structure for bicycles and in more particular compact and portable storage structures with integrated locking capabilities. Since a bike share or bike rental program has authority over the design of all of the bikes within the system, it is believed there is enormous potential for space savings. An enclosed structure is provided. The system uses bikes equipped with either inwardly folding handlebars, handlebars that twist 90 degrees or handlebars that can easily detach from the bicycle. If a bicycle is equipped with either of these types of handlebars, when the handlebars are either detached, twisted 90 degrees or folded in, the overall width of a bicycle is reduced by half, and thus enables more bikes to fit within a storage locker.

Figure 1:
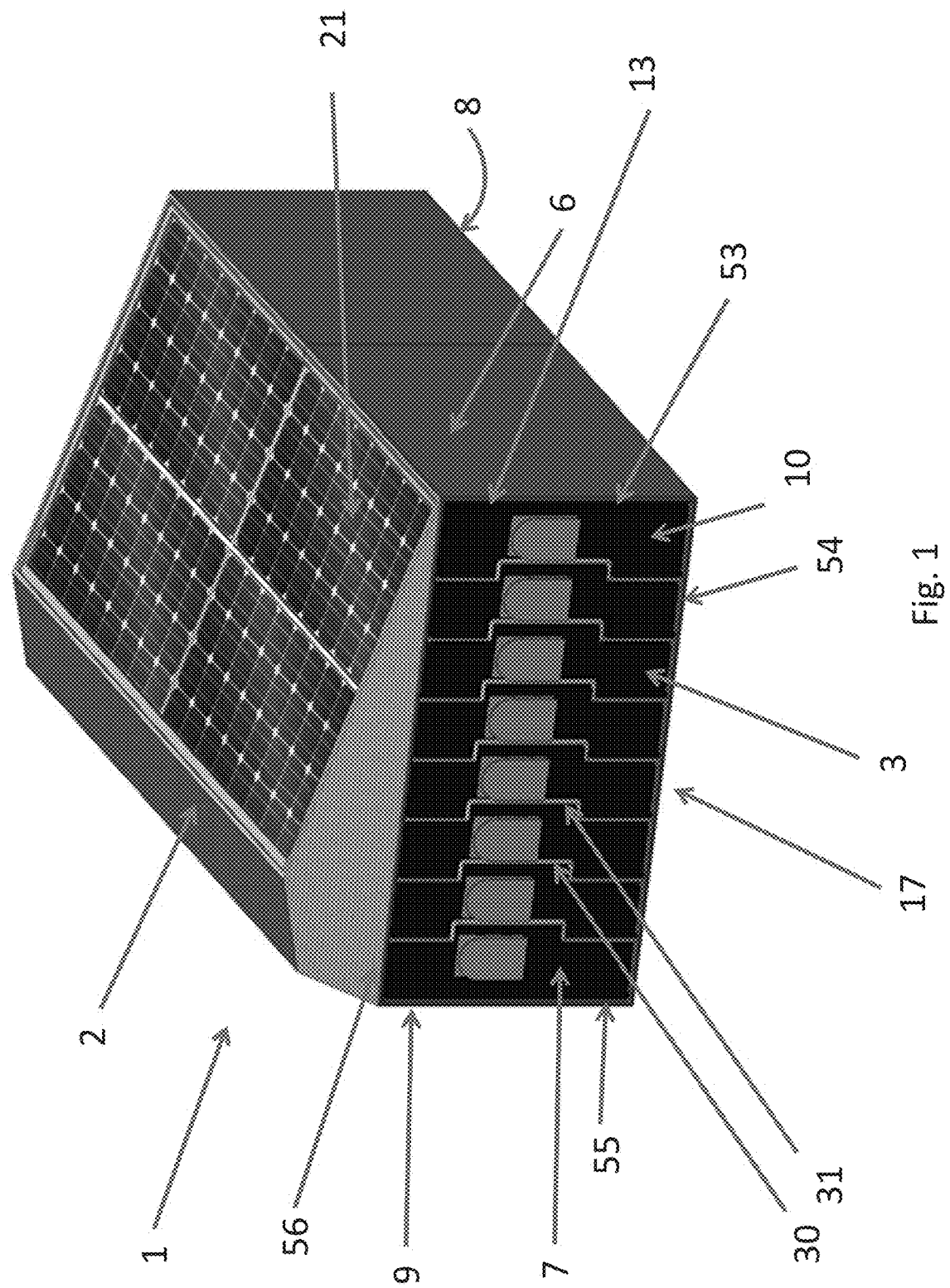
FIG. 1 is an exterior view of a storage structure with two rows of lockers back to back.

FIG. 1 is an exterior view showing an example of the storage structure, in which two rows of lockers are attached back to back, with the rows of locker doors facing away from each other. Parking spaces within car parking lots may be a convenient location for these structures. For this reason a typical embodiment may be configured to fit within the confines of a standard parking space, which in the USA has a size range of 7.5 ft-9 ft wide (2.3 m×2.75 m) by 16 ft-20 ft long (4.9 m×6 m) for perpendicular parking. This specific embodiment has advantages because it enables the highest amount of bikes to be stored and accessed from the structure, if the structure is positioned similarly to how a car would be parked. Bike users would be able to insert and remove bikes from the structure in both directions, provided that the back lockers would have sufficient room to open the locker doors without a curb or other object impeding access.

Referring to FIG. 1 in more detail, the storage structure 1 is configured to rest on a generally hard, flat surface, typically pavement or concrete. The storage structure 1 includes a bottom wall 8, roof or top wall 2 and four side walls. In this example, the bottom 8 and top wall 2 of the storage structure 1 are generally rectangular. The exterior walls are generally vertical and coupled between the bottom 8 and top wall 2. The top wall 2 may be angled to channel off rainwater and also deter users from sitting or climbing on to the storage structure. The exterior walls generally include two vertical and generally parallel sidewalls 6 and 9. The exterior walls also generally include a vertical rear panel (see e.g., FIG. 4, reference number 16) and a front locker door panel 17 that are also parallel to each other. It should be understood that the top wall 2 may be configured in a variety of shapes without departing from the scope of this disclosure. The walls and roof may be constructed from hard plastic or fiberglass, but other materials may be used without departing from the scope of this disclosure, including materials configured to enable the storage structure to blend in with its surroundings, such as a brick or vinyl siding. See e.g., FIG. 4. Another potential variation for the roof or walls is to have them covered in vegetation, such as grasses or shrubs, to make them more aesthetically pleasing to a street landscape. The top wall 2 may also be configured with a solar panel 21 as shown.

The storage structure 1 is configured with plurality of modular, individually enclosed lockers for storage of a bike 4 inside of it (one bike per locker). Looking at the exterior of FIG. 1, there may be three types of locker doors and lockers depending on the positioning of the locker relative to the rectangular front wall, e.g., a left end door 7, a right end door 10 and a plurality of doors 3 between the left end and right end doors. The three different locker door shapes allow the front wall 17 to be a rectangular shape while enabling the individual lockers to accommodate the bikes in the special positioning needed to fit them inside each locker.

Figure 2:
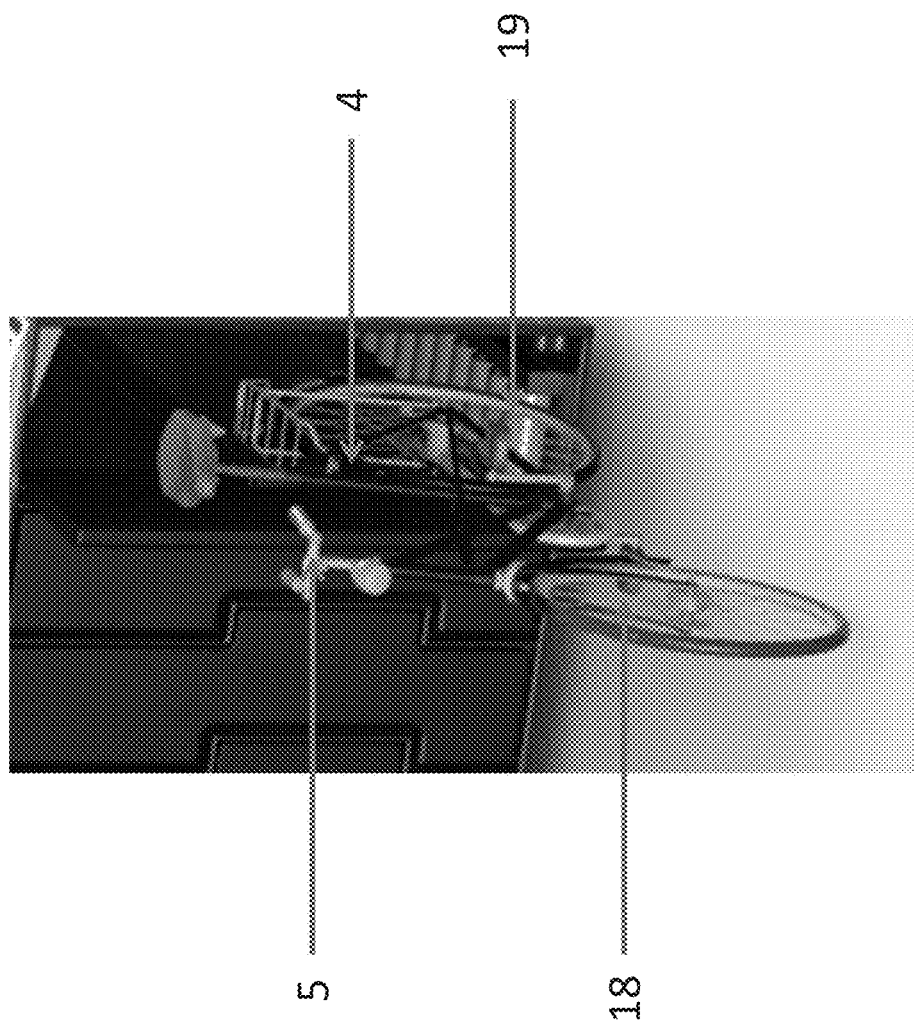
FIG. 2 is a view of the storage structure including a bicycle with folding handlebars with pedals in the proper position for storage in a locker.
Figure 3:
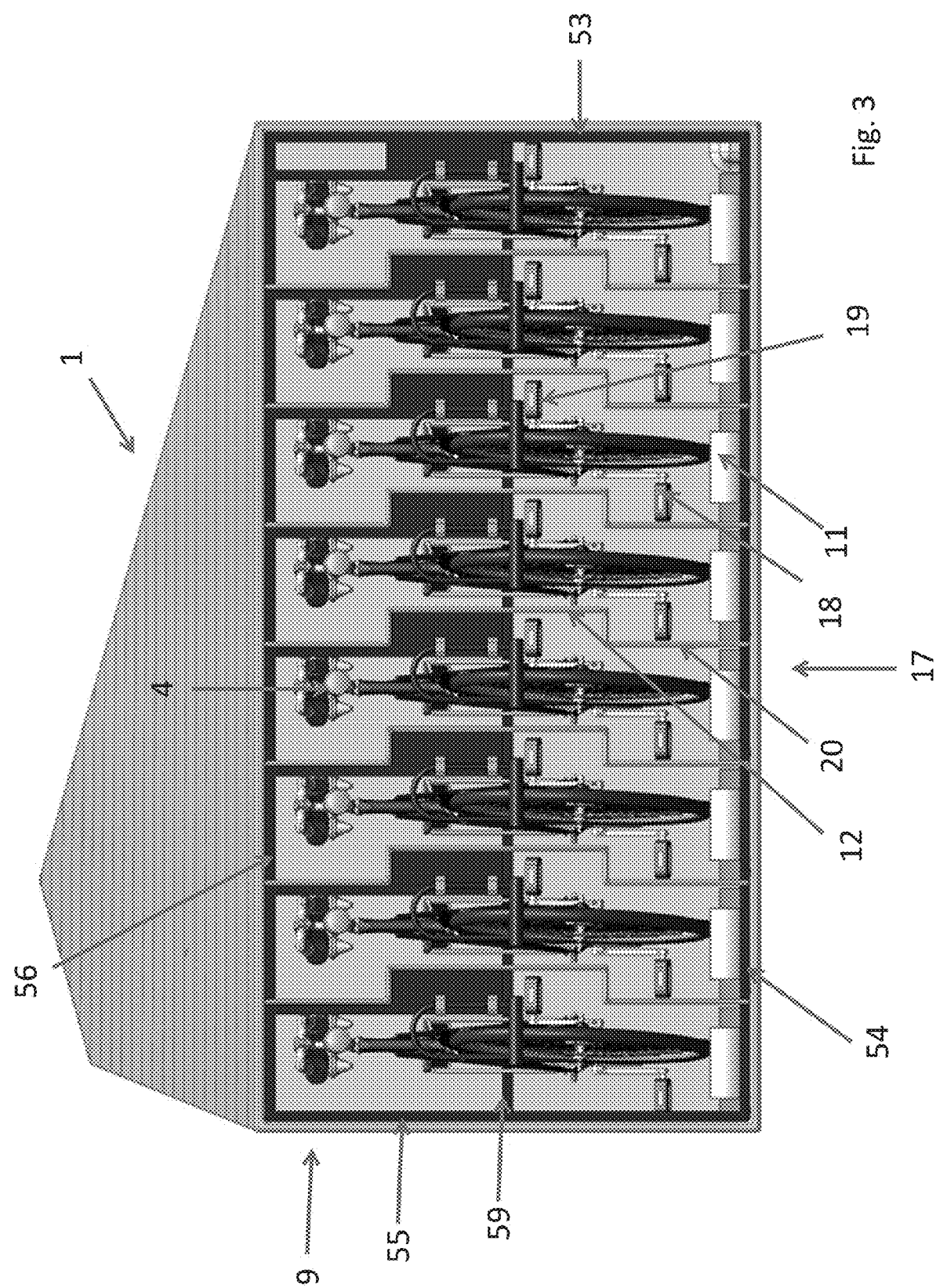
FIG. 3 is a front view of the storage structure without the locker doors.

FIG. 2 shows the positioning of a bike 4 for insertion it into the lockers. Each locker is configured with wall formed with a groove 12. The storage structure 1 is generally configured to accommodate bikes that can either be inserted front first or rear first. Each locker is configured with wall formed with a groove 12. In this example the grooved wall is located on the right hand side of the locker. Based on this configuration, the pedal 18 on the left facing side of the bike is located approximately in its lowest position, as shown. Therefore the right facing pedal 19 will be approximately all the way up, as shown. The lockers are intended for bikes 4 that have handlebars 5 that fold inward in order to reduce their overall width. This is generally shown in FIGS. 2 and 3. Alternatively, there are bicycle designs with removable handlebars, or handlebars that twist 90 degrees, which this locker shape would also accommodate.

FIG. 3 is a front view of the storage structure without the locker doors. In order to maximize the space, each locker and locker door is configured with a generally rectangular shape, but with a groove protruding from the right side corresponding with the groove 12 formed in the right side wall 20 in order to accommodate the right pedal in the up position. In this example, groove 12 protrudes out approximately 3-4 inches from the right locker wall 20. By storing adjacent bicycles in a nested configuration (with alternating pedals in the up and down position), the storage system 1 allows for storage of a plurality of adjacent bikes in a compact overlapping configuration. This allows each bike to take up less overall width during storage.

FIG. 1 shows the three types of locker doors 3, 7, 10 in an isometric view. The left end locker door 7 is furthest to the left, with hinges connected to the post 55 that connects the sidewall 9 with the front wall 17. The right end locker door 10 is the furthest to the right, and its right vertical edge will run along the post 53 that connects the sidewall 6 to the front wall 17. The middle lockers, all similar in nature to the locker displayed as 3, have a largely rectangular shape, except with the protruding groove from the locker situated to its left 30 creating a tongue in the left wall, and the locker's own protruding groove 31 extending out past the right wall into the locker situated to its right. In this embodiment the tongue and groove formation is accomplished by 90-degree angles, but other embodiments are possible as well, such as a more rounded shape.

FIG. 3 is a front view of the storage structure 1 without the locker doors. In this example, the front wall is generally supported by a frame structure including a right beam 53, bottom beam 54, left beam 55 and top beam 56. The frame structure may be constructed from a variety of materials including metal and or other framing materials. The left end locker door may have hinges coupled to the left beam 55, top beam 56 and bottom beam 54. Other locker doors, in order to accommodate the groove of the locker immediately to its left may have hinges coupled to the top beam 56 and bottom beam 54. FIG. 8b shows an example of door 10 in this embodiment with hinge pins in the upper left and lower left corners. It should be understood that a variety of frame structures and hinge arrangements may be used without departing from the scope of this disclosure. FIG. 3 also shows some of the locking structure, which will be further described in FIGS. 5-8.

Figure 4:
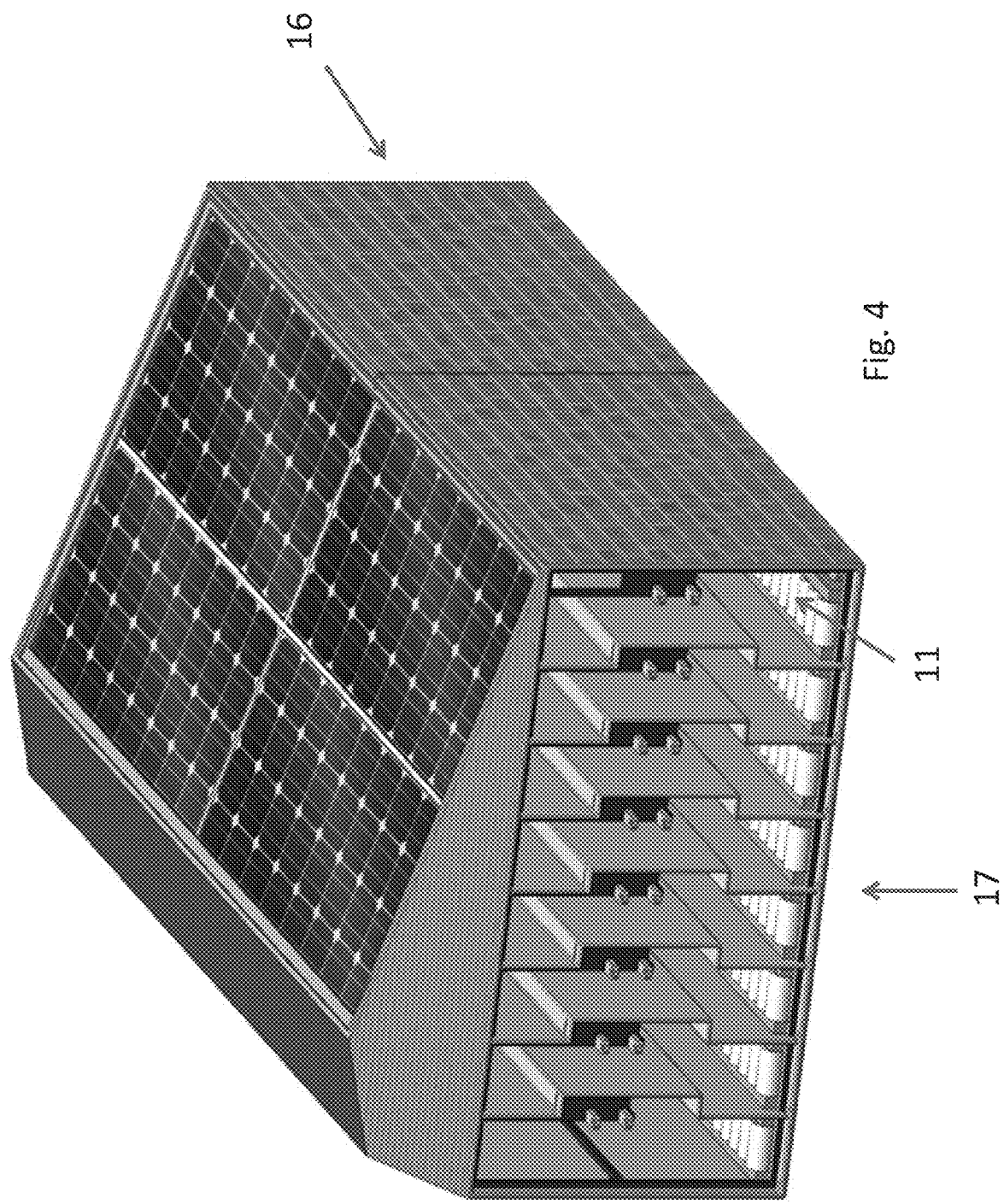
FIG. 4 is an isometric view of the storage structure with the front doors removed.

FIG. 4 is an isometric view of the storage structure 1 with the front doors removed. A conveyor is disposed on the floor of the locker. In this example, the conveyor includes a rolling cylinder track 11 disposed on the locker floor. The rolling cylinder track 11 generally covers the majority of the floor length of each locker from the front wall 17 to approximately the back wall 16. It should be understood that other conveyer structures including belt or other low friction systems may be used without departing from the scope if this disclosure. The conveyer enables a bike 4 to be pushed backwards into or out of the locker without moving the pedals, which is the case with most bike designs. This allows the pedals to remain generally within the groove 12 as the bike 4 is moved.

Figure 5:
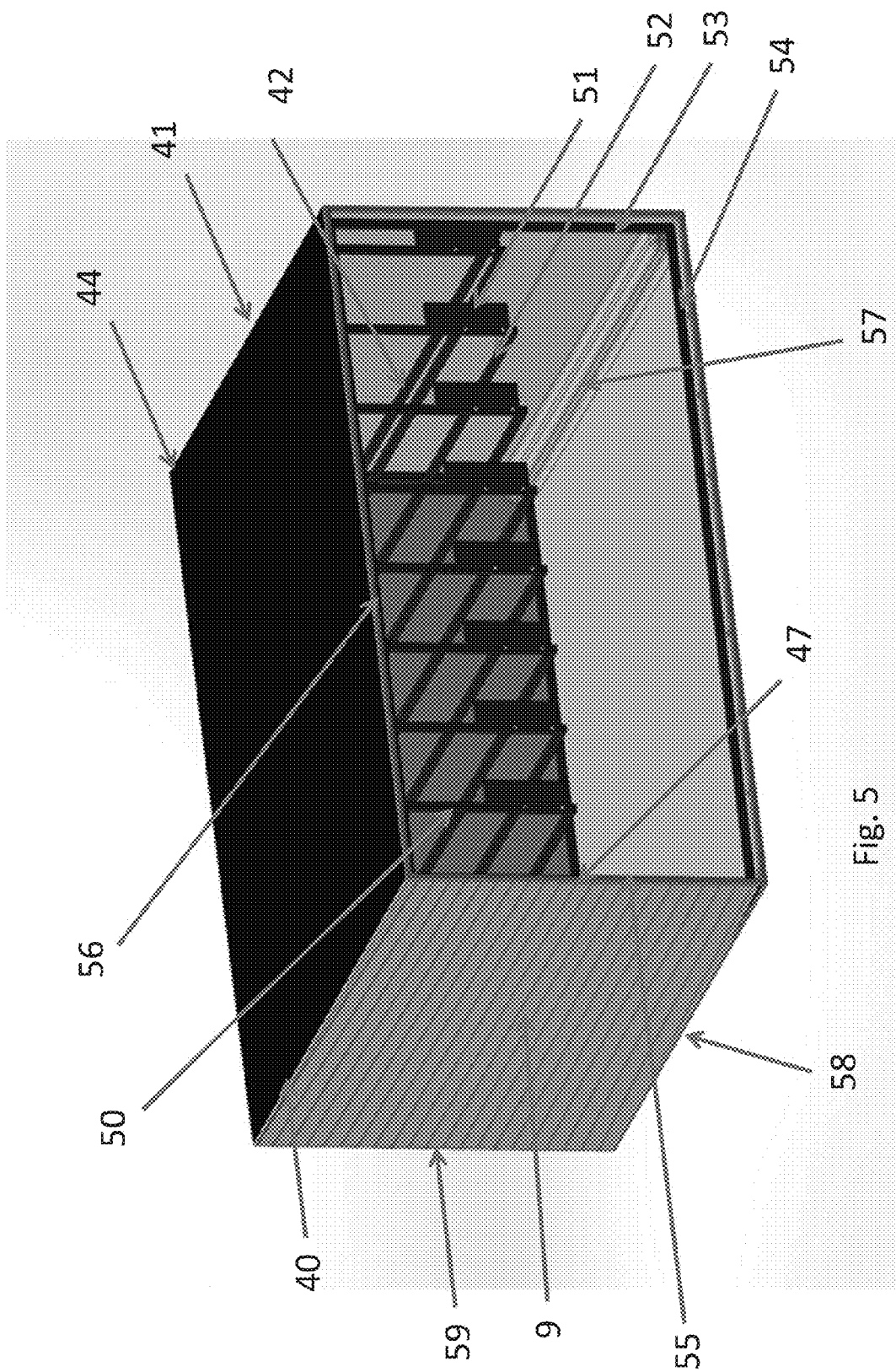
FIG. 5 is an exterior view of the storage structure with just the metal security bars and walls visible.

FIG. 5 is an exterior view of the storage structure with the frame structure and walls visible. To protect against theft, the storage structure includes a frame structure (metal bars in this example) protecting the structure in any direction that thieves could try to pull the bike out of the structure, even if they were to cut through a wall. The front of the storage structure includes a right beam 53, bottom beam 54, left beam 55 and top beam 56 creating a generally rectangular shape as shown in FIG. 3. A steel locking post 50 for each locker is connected to the top beam 56 in a T-shape. These are referred to as locking posts because they will secure the locker door lock, as further described in FIGS. 6 and 7. The locking posts 50 are generally arranged vertically from the top beam 56 to approximately half of the distance to the base, along the top right edge of each locker. The locking posts 50 extend down into the rectangular area created by the locker's groove, but leave enough room for the highest point of the bike's right pedal to pass underneath. The locking post 50 may also connect at a 90-degree angle to a horizontal reinforcing beam 52 that runs from the front wall to the back wall. At the back wall the reinforcing beam 52 is connected to a perpendicular horizontal support beam (shown in FIG. 3, reference number 59) that runs along the back wall to both edges, creating a T-joint. There will be a locking post 50 and horizontal support beam 52 for each locker. These support structures are spread out across the structure, approximately 8 inches apart, which creates enough space in between to fit a bicycle with folded handlebars.

FIG. 5 also shows the majority of the metal exterior support structure. The sidewalls, 6 and 9, may also be configured with metal support beams on the bottom (58 on the left sidewall, 57 on the right sidewall) and top (40 on the left side, and 41 on the right side) running parallel connecting to the bottom wall, top wall and metal posts on either side connecting to the front wall and the back wall. This is shown as 59 on the left sidewall, connecting to the back wall 16, and 55 on the left sidewall, connecting to the front wall 17. On the right sidewall, this post is shown as 53 connecting to the front wall, and 44 connecting to the back wall. The beam running horizontally in the middle of the side wall is a support beam 42 (right side—shown) and 47 (left side—hidden) that connects to the side posts 53 and 44 on the right side, and posts 59 and 55 on the right side. These support beams 42 and 47 are generally the same height as the interior support beams 52 that attach to the locking posts 50.

Figure 6:
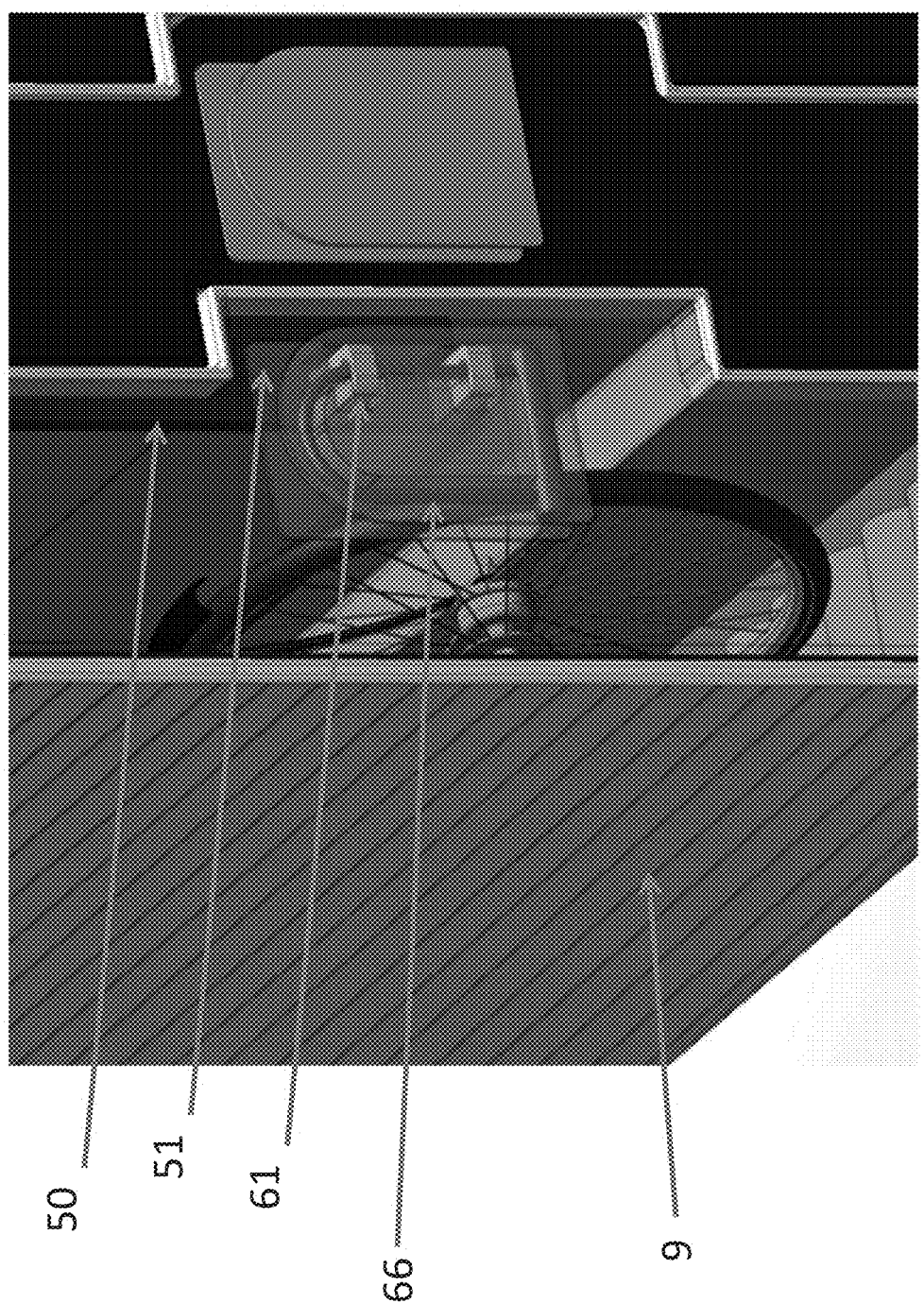
FIG. 6 is a close up view of a lock configuration with a protective lock plate.
Figure 7:
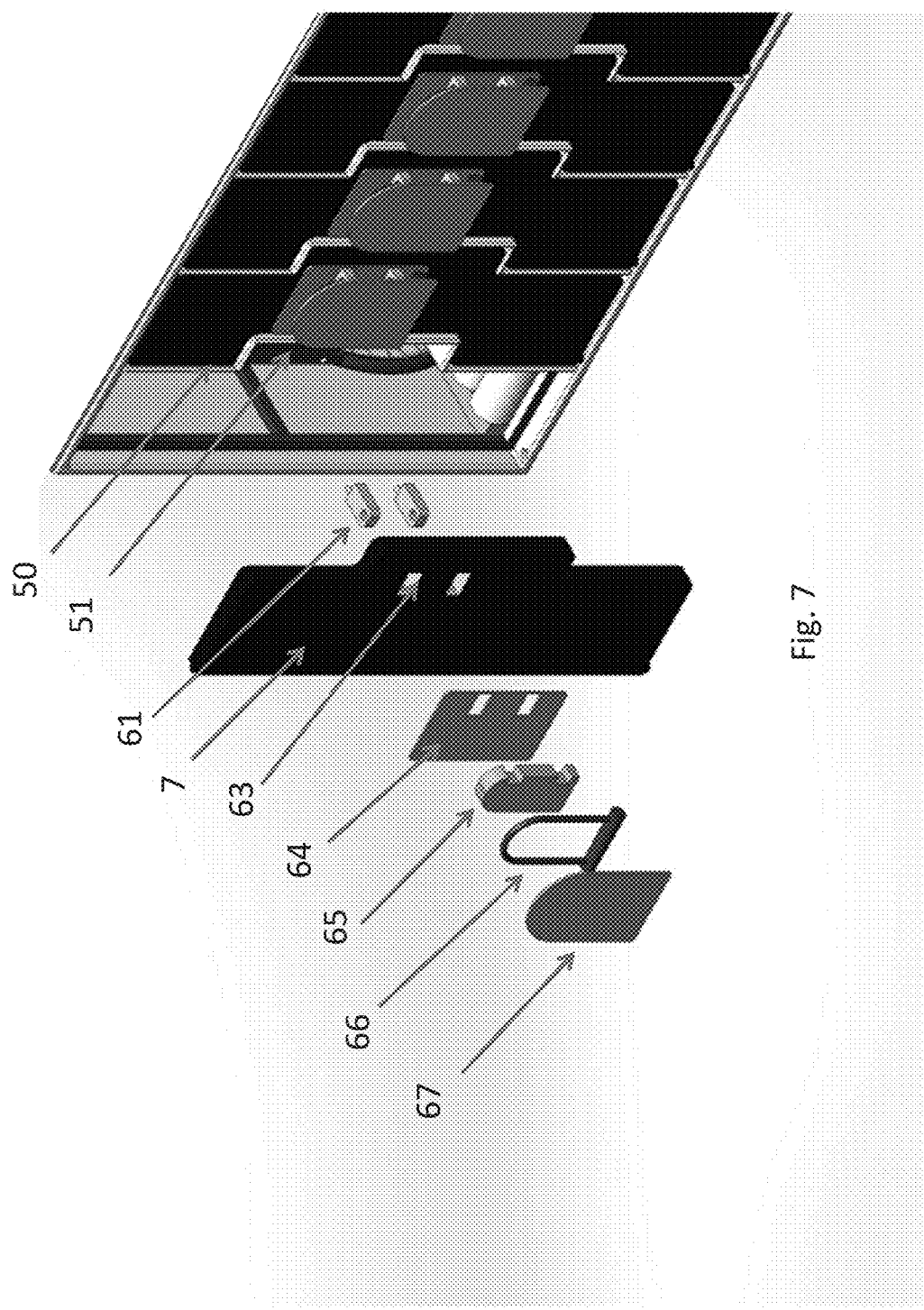
FIG. 7 is an exploded view of pieces that make up the locker doorframe and locker door.

FIGS. 6-8 show how each locker door is shut and locked to create maximum protection of the bikes. In this example, the storage structure is configured for use with commercially available U-Locks (or D-Locks) 66, which enables the cyclist to use the same lock for the bike locker as they do for locking the bike when they have ridden it away from the locker. These U-Locks can be locked by a numeric combination, keys, or a Bluetooth electronic key. The approximate dimensions for a standard U-Lock, which FIGS. 6-8 show, are between 12.5 cm-20.5 cm (5"-8") in width (if looking at the lock with the bolt piece being on the bottom, and the shackle in an elongated semi-circle above, as in FIG. 6), between 20.5 cm-28 cm (8"-11") long, with an average depth (or height) between 2.5 cm and 5 cm (1"-2").

A unique aspect of the disclosed configuration bolsters the effectiveness of the U-Locks by making them more difficult to cut and tamper with. The design achieves this by limiting the space and angles a thief would need to cut the U-Lock with a saw or bolt cutters, or to pry the door open with a crowbar or other prying tool.

FIG. 6 is a close up view of a lock configuration with a protective lock plate 51 (the door is shown transparent for clarity). The shackle of U-Lock 66 is secured through two vertically positioned eyelets 61 that extend outwardly from the locking post 50. For the user to lock the U-Lock from a separated position, the shackle is generally lowered from above through the two eyelets that are connected to the locking post. Once the shackle passed through the eyelets, it is inserted into the bolt below. From there the user may lock the bolt to the shackle based on the specific type U-Lock, i.e., via a key, combination wheels, electronic lock elements or the like.

The locking post 50 may be made of very secure metal, such as steel or iron, to deter theft. In this example, starting approximately 5 cm-20.5 cm (2"-5") below the highest point of the groove in the locker, the two rounded eyelets 61 extend outwardly from the locking post 50. They are bolted or otherwise securely fastened to the locking post. Since the eyelets 61 are a primary point of security between the U-Lock and the entire structure, they will typically be approximately the same size or larger in thickness than the diameter of the shackle on the U-Lock. In a typical commercial deployment, the eyelets would typically have about a 13 mm diameter or larger.

To better illustrate how the locking system works with the locker doors, the following is an example of how a user first closes the locker door and then secures the lock. When the locker door (3, 7, or 10) is open, it has 2 rectangular shaped openings or holes (FIG. 7, reference number 63) located just below the top of the door groove protruding out to the right side. When the locker door gets shut, the openings 63 are penetrated by the two eyelets 61 that protrude from the vertical locking post 50. Once the door is shut, the eyelets 61 are now outside of the enclosed locker, and the openings formed in the eyelets 61 have enough space for the shackle of the U-Lock to slide through and connect to the bolt on the other side, thus creating the lock. Therefore, the door will not be able to open unless the U-Lock has been unlocked and the lock shackle 66 removed from the eyelets 61.

Figure 8A:
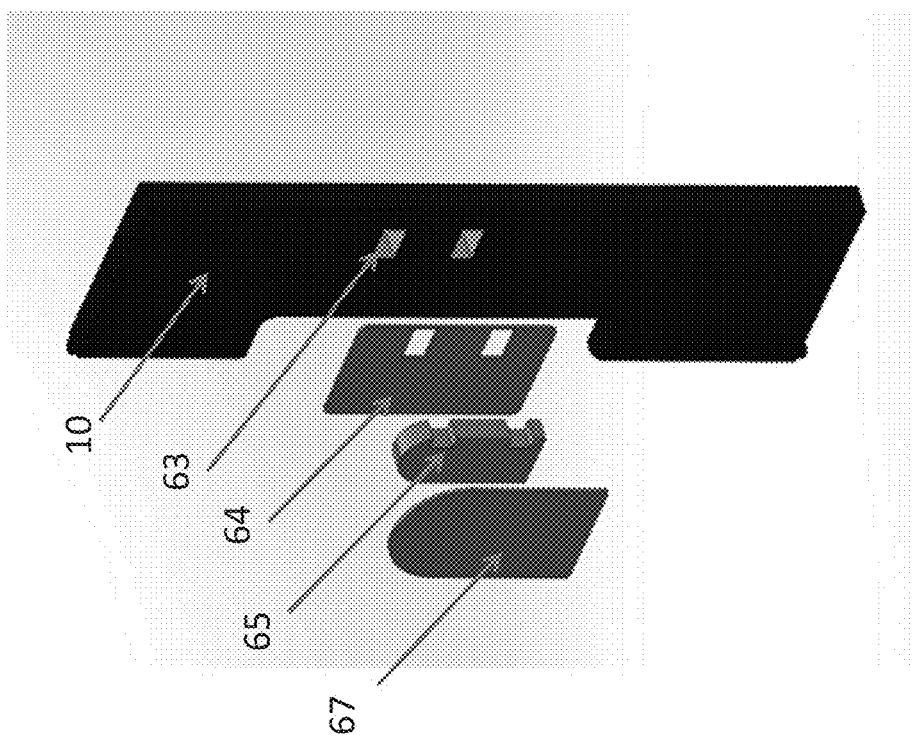
FIGS. 8a and 8b show a locker door in an exploded view and an attached view.
Figure 8B:
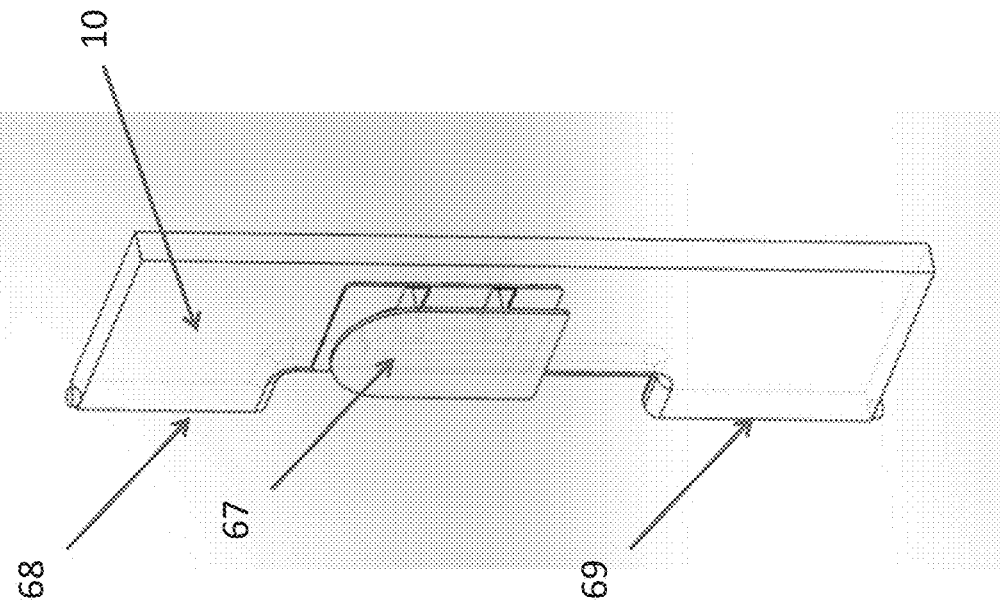

On the locker door, FIGS. 7 and 8 show the locking structure in more detail including structures configured to further protect the U-Lock from damage, from tools such as saws or bolt cutters. FIG. 7 shows an exploded view of the locking structure built into the storage structure. This view shows how different parts may be assembled to create a secure structure for the U-Lock. In this example, the first piece attached to the outside of the door is a metal base plate 64 for added protection of the door. Secured on top of the metal plate, and to the left of the protruding eyelets, is a U-lock bracing piece 65 of solid material (metal, wood, or hard plastic). It is intended that the U-Lock 66 will fit tightly around this bracing piece in order to avoid tampering or prying of the lock or door. Therefore, this bracing piece follows the approximate shape of the interior edges of the U-Lock shackle, and is positioned between and to the left side of the two eyelets, as shown in FIGS. 7 and 8a, so as to guide the U-Lock through the eyelets, but not to block its path.

The U-lock bracing piece 65 generally includes a planar top and generally has a thickness that is at least slightly thicker than the thickest part of the U-Lock. An anti-theft cap plate 67 may be coupled to the U-lock bracing piece 65. The anti-theft cap plate 67 is configured to have the U-Lock fit in between the metal base plate 64 on the door and the anti-theft plate 67. The anti-theft cap plate 67 may be metal plate that extends over both the U-Lock shackle and the bolt on all directions, to provide a layer of protection for the U-Lock. Therefore its shape will mimic that of the U-Lock, except slightly larger. The purpose of this piece will be to make it difficult for thieves to use tools such as saws or bolt cutter to attack the shackle or bolt of the U-Lock. The anti-theft cap plate 67 will typically be made of hardened metal that is very difficult to cut through.

The doors 3, 7 and 10 may be made of hard plastic or fiberglass for some flexibility to avoid bending or dents, which could damage their hinges and make the difficult to open. However, the doors will need added strength near the lock to solidify that area. To add a layer of strength, the door may be reinforced in the middle area where it will not have hinges, see e.g., metal base plate 64. This area on the door is defined as the surface on the door above where the groove starts on the bottom and below where the groove ends on the top, and extending to both edges. The top part of the door where hinges will exist (FIG. 8b, reference numbers 68 and 69) is strengthened by the locking post 50 as a doorstop. Additionally, the locking post 50 may be configured with a locking post support plate 51 (FIGS. 5, 6, 7), located generally between the locking post 50 and the far right vertical door edge of the groove 12. The locking post support plate 51 may be formed of metal and will generally protect against intrusion and blunt force to the door.

The individual lockers are designed to be modular in nature, so pluralities of lockers that can fit into an external frame of the structure represent the intended embodiment. For instance, the external structure could take up a whole city block and contain hundreds of bikes within individual lockers.

The structure is designed to accommodate several different types of roofs, including a flat roof or an angled roof. FIG. 9 shows an embodiment with a solar panel 21 on the roof of the structure, which could be used to charge electrical components of the storage system and/or bicycles, such as lights, GPS trackers, or bicycle electric-assist drive system and associated energy storage system or battery. FIG. 10 is a side profile of a structure that contains solar panels and generally shows the placement of the accompanying electrical apparatus to support the solar panel, such as an energy storage device or battery 22, inverter 23, and power outlet strip 24.

Further Description of the disclosed approach is included in the Appendix which is part of the application and is incorporated by reference in its entirety as if fully set forth herein. All references cited herein and in the appendix are incorporated by reference in their entirety as if fully set forth herein.

What is claimed is:

1. A storage structure for storing at least one bicycle having a frame, a pair of wheels and a pair of pedals, each of the pedals having an outside edge, each of the pedals having a horizontal pedal width defined between the outside edge of the pedal and the frame of the bicycle, the storage structure comprising:
   a plurality of lockers, each locker having:
   a top wall, a bottom wall, a rear wall, first and second side walls and a movable front wall, the first side wall having a first portion with a first spacing between the first side wall and the frame of the bicycle, the first spacing being less than the horizontal pedal width, the first side wall having a second portion formed with a horizontal groove, the horizontal groove providing a second spacing between the frame of the bicycle and the horizontal groove, the second spacing being greater than the horizontal pedal width, the horizontal groove being configured to receive one of the pedals.

2. The storage structure of claim 1 wherein the horizontal groove extends generally from the front wall of the locker to the rear wall of the locker.

3. The storage structure of claim 1 wherein two adjacent lockers share at least one side wall and are configured to store bicycles with their pedals in a nested configuration.

4. The storage structure of claim 1 further comprising a conveyer located on the bottom wall of the locker, the conveyer being configured to facilitate insertion of the bicycle into the locker without rotating the bicycle wheels.

5. The storage structure of claim 4 wherein the conveyer provides a reduced friction surface to facilitate insertion of the bicycle into the locker without rotating the bicycle wheels.

6. The storage structure of claim 4 wherein the conveyer includes plurality of rolling cylinders to facilitate insertion of the bicycle into the locker without rotating the bicycle wheels.

7. The storage structure of claim 1 wherein the bicycle is configured with folding handle bars having a folded width and the side walls have a spacing selected to accommodate the folded width of the folding handle bars.

8. The storage structure of claim 1 wherein the bicycle is configured with handle bars that twist approximately 90 degrees to have a twisted width and the side walls have a spacing selected to accommodate the twisted width of the twisting handle bars.

9. The storage structure of claim 1 wherein the bicycle is configured with removable handle bars having a reduced width and the side walls have a spacing selected to accommodate the reduced width of the removed handle bars.

10. The storage structure of claim 1 wherein the bicycle further comprising a lock support structure configured to receive a U-lock.

11. The storage structure of claim 10 wherein the U-lock is configured to be opened with at least one of a key, a numeric combination and an electronic key.

12. The storage structure of claim 1 further comprising a lock support structure with a frame at least partially supporting the top wall, the frame including a locking post located adjacent to the front wall.

13. The storage structure of claim 12 wherein the lock support structure further comprises a pair of eyelets coupled to the locking post, configured to receive a shackle of a U-lock.

14. The storage structure of claim 13 wherein the eyelets are eye bolts.

15. The storage structure of claim 13 wherein the eyelets are configured to pass through openings formed in the movable front wall.

16. The storage structure of claim 15 wherein the openings formed in the movable front wall are reinforced with a plate.

17. The storage structure of claim 16 further comprising a U-lock brace coupled to the plate, the U-lock brace being configured to at least partially fill an interior portion of the U-lock.

18. The storage structure of claim 16 further comprising a cap plate coupled to the U-lock brace.

19. The storage structure of claim 12 wherein the lock support structure further comprises a locking plate configured to partially cover the U-lock.

20. The storage structure of claim 1 wherein the top wall is configured with solar cells configured for charging at least one energy storage device.

21. The storage structure of claim 20 wherein the bicycle includes an electric-assist drive system and the energy storage device is coupled to the electric-assist drive system.

22. The storage structure of claim 1, further comprising a GPS locating system configured to track the location of at least one bicycle.

23. The storage structure of claim 1 wherein the second side wall has a first portion with a first spacing between the second side wall and the frame of the bicycle, the first spacing being greater than the horizontal pedal width, the second side wall having a second portion formed with a horizontal groove, the horizontal groove providing a second spacing between the frame of the bicycle and the horizontal groove, the second spacing being less than the horizontal pedal width.

24. A storage structure for storing at least one bicycle having a frame, a pair of wheels and first and second pedals, each of the pedals having an outside edge, each of the pedals having a horizontal pedal width defined between the outside edge of the pedal and the frame of the bicycle, the first pedal being disposed in a generally upward direction, the second pedal being disposed in a generally downward direction, the storage structure comprising:
   a plurality of lockers, each locker having:
   a top wall, a bottom wall, a rear wall, first and second side walls and a movable front wall, the first side wall having a first portion with a first spacing between the first side wall and the frame of the bicycle, the first spacing being less than the horizontal pedal width, the first side wall having a second portion formed with a horizontal groove, the horizontal groove providing a second spacing between the frame of the bicycle and the horizontal groove, the second spacing being greater than the horizontal pedal width, the horizontal groove being configured to receive the first pedal.

25. The storage structure of claim 24 wherein the second side wall has a first portion with a first spacing between the second side wall and the frame of the bicycle, the first spacing being greater than the horizontal pedal width and being configured to receive the second pedal, the second side wall having a second portion formed with a horizontal groove, the horizontal groove providing a second spacing between the frame of the bicycle and the horizontal groove, the second spacing being less than the horizontal pedal width.

* * * * *